Patented Sept. 3, 1940

2,213,517

UNITED STATES PATENT OFFICE

2,213,517

PHTHALOCYANINE DYESTUFF

Berthold Bienert and Sebastian Gassner, Leverkusen-I. G. Werk, Germany, assignors to General Aniline & Film Corporation, a corporation of Delaware No Drawing. Application October 21, 1936, Serial No. 106,829. In Germany October 23, 1935

1 Claim. (Cl. 260—314)

The present invention relates to new pigments of the phthalocyanine series.

Phthalocyanines represent a new class of pigment dyestuffs which can be prepared in various ways, f. i. by heating an ortho-dihalogen-benzene or an ortho-halogennitrile of the benzene series with cuprous cyanide or by heating o-dinitriles of the benzene series with copper or copper salts. The compounds which are obtainable according to the said processes are characterized by having chemically combined copper. In a similar manner phthalocyanines containing other polyvalent metals than copper can be prepared. Also metalfree phthalocyanines have been prepared either by removing from the phthalocyanines those metals which are relatively loosely bound, such as magnesium, or by heating ortho-dinitriles of the benzene series with an alkali metal alcoholate followed by a hydrolysis of the alkali metal compound thus formed. Phthalocyanines which are derived from ortho-dihalogenbenzenes, ortho-halogennitriles of the benzene series or ortho-dinitriles of the benzene series are for brevity's sake in the following designated as "phthalocyanines of the benezene series."

Most of the hitherto known phthalocyanines show clear blue shades and part of them are characterized by their excellent fastness properties. As far as within the phthalocyanine series products of green coloration have been obtained, they are relatively dull in shades or show insufficient fastness properties. It is, therefore, a problem to prepare phthalocyanines which combine a clear green shade with the fastness properties of f. i. a copper phthalocyanine of the benzene series.

The present invention is based upon the discovery that phthalocyanines of clear green to greenish-blue shades can be obtained by introducing into the benzene nuclei certain substituents such as a further benzene nucleus or one of the following substituents:

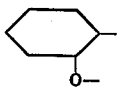

and

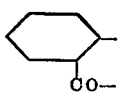

In accordance therewith our invention is concerned with phthalocyanines of the benzene series containing in the benzene nuclei substituents of the character described. These new phthalocyanines can be prepared by starting from ortho-dinitriles of the diphenyl, fluorenone or diphenylene oxide series and to subject these compounds to the ordinary working conditions known to effect formation of phthalocyanines. Furthermore, such compounds can be employed as starting materials as are capable of being transformed into ortho-dinitriles in the course of the reaction; examples for such compounds are ortho-halogennitriles and ortho-dihalogen compounds of the diphenyl, fluorenone or diphenylene oxide series, which, upon the action of certain metal cyanides, such as f. i. of cuprous cyanide, are transformed into ortho-dinitriles and then into phthalocyanines. As to the various methods of preparing phthalocyanines from ortho-dinitriles reference is made to what is stated above with respect to the prior art. We, therefore, confine ourselves to state that copper salts or free copper are preferred reagents for preparing phthalocyanines and that the reaction may be performed in the presence of solid diluents such as sodium sulfate or of liquid diluents such as pyridine, quinoline, benzophenone, nitrobenzene or ortho-dichlorobenzene.

The new phthalocyanines which are obtainable in accordance with this invention generally show very clear green to greenish-blue shades. Therefore, and in view of the excellent fastness properties they represent valuable pigment dyestuffs and can be employed, f. i., for graphic wallpaper printing and for coloring artificial silk. Of particular importance are the copper phthalocyanines derived from ortho-dinitriles of the diphenyl series and the corresponding metalfree compounds. Our new phthalocyanines may contain various other substituents without departing from the scope of this invention. Thus, they may be substituted by halogen atoms, which can either be introduced into the starting materials or into the ready-made phthalocyanines. All these new compounds may be pasted by dissolving the same in sulfuric acid monohydrate or in ethyl sulfuric acid with subsequent precipitation in water; sulfuric acid monohydrate is preferred in case of compounds which, owing to the presence of substitutents, are not capable of being sulfurized. In this manner, the phthalocyanines are converted into a finely dispersed state.

Among the substitution products of our new phthalocyanines particular importance is attached to the sulfonic acids which can easily be obtained by the action of sulfuric acid monohydrate or fuming sulfuric acid. These sulfonic acids are soluble in water and can be converted into new pigment dyestuffs by treating the same with salts of polyvalent metals or with lake forming amines.

The following examples illustrates the invention without, however, restricting it thereto the parts being by weight:

Example 1

8.16 parts of 4-phenylphthalonitrile are added at 70° C. to a solution consisting of 0.46 part of sodium in 41 parts of ethyl alcohol, whereupon the mixture is heated to boiling for ½ hour while refluxing. The precipitating dyestuff is sucked off, rinsed with alcohol and purified by extraction with hot alcohol. The product thus obtained in a good yield is dissolved in ethyl sulfuric acid and precipitated by introduction into a 80% dilute acetic acid. On filtering, rinsing with water and drying a dyestuff of a clear, brilliant green shade is obtained. The probably metal-free product thus formed is especially suitable as pigment dyestuff. By dissolution in sulfuric acid monohydrate or fuming sulfuric acid the product is converted into its sulfonic acid which upon transformation into a metal lake can likewise be employed as pigment dyestuff.

Example 2

10 parts of 3.4-dicyanodiphenyl (4-phenylphthalonitrile) and 40 parts of cuprous chloride are heated in the presence of small quantities of pyridine for 20–25 minutes to 200–210° C. On cooling the mixture obtained is pulverized and boiled with alcohol and hydrochloric acid. The phthalocyanine obtained as residue in a good yield represents an amorphous dark-green powder, which, when applied as pigment dyestuff, is distinguished by its clear green shade and excellent fastness to light. In order to convert the product into a finely dispersed state it can be dissolved in quinoline and precipitated by introducing it into hydrochloric acid The 3.4-dicyanodiphenyl serving as starting material can be obtained from the 3-nitro-4-amino-diphenyl according to known processes by first converting the amino group into the cyanic group according to the Sandmeyer's reaction and then reducing the nitro group into the amino group, whereupon it is also transformed into the cyanic group.

Example 3

The same product as described in Example 1 and 2 is obtained by heating for 1 hour to 180° C. an intimate mixture of 10 parts of 3.4-dicyanodiphenyl and 5 parts of cuprous chloride together with 40 parts of water-free sodium sulfate. The product is worked up in the usual manner by mixing with water and boiling with hydrochloric acid and dilute sodium lye. The residue thus obtained represents the practically pure copper complex.

Example 4

A mixture consisting of 5.6 parts of water-free nickel chloride, 20 parts of 3.4-dicyanodiphenyl and 60 parts of quinoline are heated for 1 hour to 200° C. On cooling, the reaction mixture is introduced into excess hydrochloric acid whereupon the crude dyestuff is extracted by means of alcohol. 15.3 parts of a bluish-green dyestuff are thus obtained which correspond to 71.3% of the theoretical amount.

Example 5

8 parts of 3.4-dicyanodiphenyl and 4 parts of cobaltous chloride are intimately ground together with 32 parts of sodium sulfate and heated for ½ hour to 230° C. On boiling with dilute hydrochloric acid and sodium lye 6.5 parts of a bluish-green dyestuff are obtained in a yield of about 75.5% of the theoretical amount.

Example 6

60 parts of quinoline and 20 parts of 3.4-dicyanodiphenyl are heated together with 20 parts of water-free stannous chloride for 1 hour to 180–200° C. The dyestuff thus obtained forms a double compound with quinoline and crystallizes in a good yield in form of small needles, which are purified by sucking off and rinsing with pyridine and alcohol. On dissolving in ethyl sulfuric acid and pouring into water a clear green dyestuff is separated which is now free from quinoline.

The tetrasulfonic acid of the tetraphenyl-(4)-tinphthalocyanine is a very clear yellowish-green lacquer-dyestuff of excellent fastness to light.

Example 7

40 parts of benzophenone and 20 parts of 3.4-dicyanodiphenyl are heated together with 10 parts of zinc powder for about 1 hour to 230–250° C. On blowing off the benzophenone by means of steam the residue is boiled with dilute hydrochloric acid and sodium lye and extracted by means of alcohol in the hot-extractor. A green dyestuff is thus obtained in a good yield which may be pasted from ethyl sulfuric acid.

Example 8

20.5 parts of water-free aluminium chloride are gradually added while stirring into a solution consisting of 41 parts of 3.4-dicyanodiphenyl in 205 parts of quinoline, whereupon the whole is heated for about 2 hours to 200° C. and then for another 2 hours to 220° C. On working up the green reaction mixture as described in Example 9 a green pigment dyestuff is obtained in an excellent yield which may be converted into the corresponding sulfonic acids by treating it with sulfonating agents.

Example 9

205 parts of quinoline, 41 parts of 3.4-dicyanodiphenyl and 23 parts of water-free iron chloride are heated while stirring for about 2 hours to 230–235° C. The still hot reaction mixture is introduced into dilute hydrochloric acid while stirring, whereupon the dyestuff is filtered, rinsed, and, for further purification, boiled with dilute sodium lye and alcohol.

A dark-green powder is thus obtained which is soluble in pyridine with a bluish-green shade. When treating it with sulfuric acid monohydrate it is converted into a sulfonic acid which yields on the addition of dilute sodium lye and hydrosulfite a brownish-red vat.

Example 10

A mixture of 41 parts of 3.4-dicyanodiphenyl and 22 parts of litharge is heated while stirring to 200–210° C. and kept at this temperature for 3–4 hours. On cooling the brittle reaction product is ground and boiled with dilute acetic acid and dilute sodium lye. For further purification the raw-product is extracted by means of hot pyridine. A brilliant yellowish-green pigment dyestuff is thus obtained.

Example 11

4 parts of tetraphenyl-4-copperphthalocyanine are exposed in a closed vessel at ordinary temperature to 4 parts of bromine. After few hours the bromine has nearly completely been absorbed by the dyestuff. The dark colored addition compound thus obtained is heated in a closed vessel for about 2 hours to 200° C., whereby the bromine is caused to enter the molecule, the hydrogen bromide being split off. A bromine containing pigment dyestuff of a brilliant clear green shade is thus obtained in a nearly quantitative yield. It shows a more yellowish tint when compared with that of the starting material.

Example 12

A solution of 2.6 parts of the tetraphenyl-(4)-copperphthalocyanine which is obtained by the action of 3.4-dicyanodiphenyl with cuprous chloride in 53 parts of dry nitrobenzene is heated for 1 hour to 190–195° C. with the addition of 0.5 part of iodine and 2.1 parts of bromine in 10 parts of nitrobenzene. On blowing off the diluent by means of steam 3.2 parts of a dyestuff are obtained the bromine content of which is 24% which corresponds to 26.7% of the theoretical amount. The sulfonation product of the dyestuff thus obtained is soluble in sulfuric acid monohydrate with a reddish-brown shade.

Example 13

A solution of 20.4 parts of 3.4-dicyanodiphenyl in 120 parts of nitrotoluene is allowed to stand for 12 hours at room temperature with the addition of 0.5 part of iodine and 20.4 parts of sulfurylchloride. The mixture is heated for 3 hours to 80° C., another 3 hours to 100° C., and furthermore for 5 hours to 140° C. On cooling, air is blown through the reaction mixture whereupon 10.2 parts of cuprous chloride and 41.1 parts of pyridine are added; the whole is then heated for 3 hours at 180–185° C. After removing the solvent by means of steam the residue is boiled with dilute hydrochloric acid and sodium lye. 19.4 parts=74.7% of the theoretical amount of a dyestuff are thus obtained which probably consists of about 34% of the tetrachlorine compound and about 66% of the trichlorine compound.

Example 14

A mixture consisting of 107 parts of dry nitrobenzene, 17.7 parts of 4'-nitro-3.4-dicyanodiphenyl (obtained by nitrating 3.4-dicyanodiphenyl and separating the difficultly soluble chief product from the more easily soluble isomer F. P. 231° C.), 4.2 parts of cuprous chloride and 0.9 part of pure pyridine is heated while stirring for 2 hours to 180–185° C. On blowing off the nitrobenzene by means of steam the residue is boiled with hydrochloric acid and sodium lye. 15.5 parts which correspond to 81% of the theoretical amount of a product are obtained which is insoluble in solvents, but soluble with a reddish-brown shade in sulfuric acid monohydrate. It yields a yellowish-green pigment dyestuff of very good fastness to light. A similar dyestuff of a more bluish shade is obtained from the nitration product of the more easily soluble isomer.

Example 15

A mixture consisting of 96 parts of dry nitrobenzene, 12.2 parts of 4'-acetylamino-3,4-dicyanodiphenyl (obtained from the reduction and acetylation product of the nitro compound), 2.8 parts of cuprous chloride and 0.6 part of pure pyridine is heated for about 2 hours to 180–185° C. Upon blowing off the solvent, the residue is rinsed by means of alcohol and extracted with hydrochloric acid. 7.9 parts which correspond to 61% of the theoretical amount of a green dyestuff are obtained.

Example 16

A mixture consisting of 24 parts of benzophenone, 4.8 parts of cuprous chloride, 2.4 parts of 3.4.4'-tricyanodiphenyl (which is obtained by sublimating the sodium salt of 4.4'-dicyanodiphenyl-3-sulfonic acid with water-free potassium ferrocyanide in the vacuo and has a melting point of 250–253° C.) and 0.5 part of pure pyridine is heated for 1 hour to about 250° C. On sucking off, the dyestuff is rinsed with pyridine and extracted by means of cold hydrochloric acid. A yellowish-green dyestuff is obtained in a good yield which is unsoluble in solvents and is distinguished by its excellent brightness and good fastness properties.

A similar dyestuff is obtained when employing as starting material the sodium salt of 4.4'-dicyanodiphenyl-3.3'-disulfonic acid or the 4'-chloro-4-cyanodiphenyl-3-sulfonic acid.

Example 17

21 parts of quinoline, 7 parts of a tribromodiphenyl, which is obtained by introducing 2 bromine atoms into 2-amino-diphenyl and replacing the amino group by bromine according to the Sandmeyer's reaction, 5 parts of cuprous cyanide and 2.5 parts of cuprous bromide are heated to about 245–250° C. for 5–6 hours. On diluting the reaction mixture with pyridine the dyestuff is sucked off, rinsed by means of pyridine and boiled with dilute hydrochloric acid. A clear bluish-green pigment dyestuff is thus obtained which is soluble in sulfuric acid monohydrate with an earth-brown shade, sulfonation being effected thereby and which contains the phenyl residues in the 3-positions of the phthalocyanine benzene nuclei. An analogous dyestuff which contains the phenyl residues in 4-position is obtained when using as starting material 4-aminodiphenyl.

Example 18

2.6 parts of phthalonitrile, 4.1 parts of 3.4-dicyanodiphenyl, 2 parts of cuprous chloride and 16 parts of water-free sodium sulfate are intimately ground and heated for about 1 hour to 180–185° C. On boiling with hydrochloric acid and sodium lye 6.7 parts of a dyestuff are obtained which correspond to 91.2% of the theoretical amount.

The product thus obtained represents a bluish-green pigment dyestuff of excellent fastness to light. Its behaviour towards sulfonating agents proves that it does not merely represent a mechanical mixture of the copperphthalocyanine of phthalonitrile on the one hand and that of 3.4-dicyanodiphenyl on the other hand, the copperphthalocyanine obtained from phthalonitrile being indifferent towards sulfuric acid monohydrate, whereas the copper phthalocyanine which is obtained from 3.4-dicyanodiphenyl yields under the same conditions an easily soluble tetrasulfonic acid. The product according to this example yields, however, on solution in monohydrate a disulfonic acid which is difficultly but completely soluble in water. The sulfonating products of this dyestuff are especially suitable for the manufacture of lacquer dyestuffs.

Example 19

5 parts of 2.3-dicyanodiphenylene oxide are heated together with 1.5 parts of cuprous chloride in the presence of 30 parts of benzophenone with the addition of 0.5 part of pyridine for 2 hours at 180–190° C. On cooling and diluting with alcohol the dyestuff obtained is sucked off and rinsed with alcohol the remaining benzophenone being removed by means of steam. After boiling with hydrochloric acid the residue is sucked off and rinsed with water and alcohol. The dyestuff thus obtained represents soft small green lamellae which may directly be employed for graphic printing purposes. It is insoluble in concentrated sulfuric acid of 95%, but easily soluble with a violet shade in ethyl sulfuric acid. When dissolving in sulfuric acid monohydrate sulfonation takes place, whereby the originally blue shade turns into bordo-red.

The sulfonic acids of the phthalocyanines obtained by sulfonating with sulfuric acid monohydrate represent in form of their lakes valuable green pigment dyestuffs.

Similar dyestuffs are obtained by causing 2.3-dicyanophenylene oxide to react with nickel chloride or cobalt chloride respectively, quinoline being used instead of pyridine as diluent. The shade of the nickel compound thus obtained is similar to that of the above described copper compound, whereas the cobalt compound is somewhat more yellowish. The sulfonic acids of these two compounds yield a brownish-red vat.

We claim:

A copper phthalocyanine containing a phenyl group as a substituent on each of its four benzene nuclei.

BERTHOLD BIENERT.
SEBASTIAN GASSNER.